US011755108B2

(12) United States Patent
Sajda et al.

(10) Patent No.: US 11,755,108 B2
(45) Date of Patent: Sep. 12, 2023

(54) SYSTEMS AND METHODS FOR DEEP REINFORCEMENT LEARNING USING A BRAIN-ARTIFICIAL INTELLIGENCE INTERFACE

(71) Applicant: THE TRUSTEES OF COLUMBIA UNIVERSITY IN THE CITY OF NEW YORK, New York, NY (US)

(72) Inventors: Paul Sajda, New York, NY (US); Sameer Saproo, Fort Lee, NJ (US); Victor Shih, New York, NY (US); Sonakshi Bose Roy, New York, NY (US); David Jangraw, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 1157 days.

(21) Appl. No.: 16/149,785

(22) Filed: Oct. 2, 2018

(65) Prior Publication Data
US 2019/0101985 A1 Apr. 4, 2019

Related U.S. Application Data

(63) Continuation of application No. PCT/US2017/026585, filed on Apr. 7, 2017.
(Continued)

(51) Int. Cl.
*G06F 3/01* (2006.01)
*G06N 20/00* (2019.01)
(Continued)

(52) U.S. Cl.
CPC ............ *G06F 3/015* (2013.01); *G06F 3/013* (2013.01); *G06F 3/017* (2013.01); *G06N 3/006* (2013.01);
(Continued)

(58) Field of Classification Search
CPC .......... G06F 3/015; G06F 3/013; G06F 3/017; G06F 2203/011; G06N 5/046; G06N 20/00
(Continued)

(56) References Cited

U.S. PATENT DOCUMENTS

| 7,865,235 B2 | 1/2011 | Le et al. | |
| 2003/0069863 A1* | 4/2003 | Sadakuni | G06N 3/008 706/11 |

(Continued)

FOREIGN PATENT DOCUMENTS

| EP | 1 083 488 A2 | 3/2001 |
| WO | WO 2014/143 962 A2 | 9/2014 |

OTHER PUBLICATIONS

DiStasio MM, Francis JT (2013) Use of Frontal Lobe Hemodynamics as Reinforcement Signals to an Adaptive Controller. PLOS One 8(7): e69541. https://doi.org/10.1371/journal.pone.0069541 (Year: 2013).*

(Continued)

*Primary Examiner* — Stephen S Hong
*Assistant Examiner* — Broderick C Anderson
(74) *Attorney, Agent, or Firm* — Baker Botts LLP

(57) ABSTRACT

The present disclosure relates to systems and methods for providing a hybrid brain-computer-interface (hBCI) that can detect an individual's reinforcement signals (e.g., level of interest, arousal, emotional reactivity, cognitive fatigue, cognitive state, or the like) in and/or response to objects, events, and/or actions in an environment by generating reinforcement signals for improving an AI agent controlling the environment, such as an autonomous vehicle. Although the disclosed subject matter is discussed within the context of an autonomous vehicle virtual reality game in the exemplary embodiments of the present disclosure, the disclosed (Continued)

system can be applicable to any other environment in which the human user's sensory input is to be used to influence actions within the environment. Furthermore, the systems and methods disclosed can use neural, physiological, or behavioral signatures to inform deep reinforcement learning based AI systems to enhance user comfort and trust in automation.

19 Claims, 9 Drawing Sheets

Related U.S. Application Data

(60) Provisional application No. 62/463,276, filed on Feb. 24, 2017, provisional application No. 62/320,137, filed on Apr. 8, 2016.

(51) Int. Cl.
*G06N 3/006* (2023.01)
*G06N 5/046* (2023.01)

(52) U.S. Cl.
CPC ............. *G06N 5/046* (2013.01); *G06N 20/00* (2019.01); *G06F 2203/011* (2013.01)

(58) Field of Classification Search
USPC .......................................................... 702/19
See application file for complete search history.

(56) References Cited

U.S. PATENT DOCUMENTS

| | | | |
|---|---|---|---|
| 2006/0184273 A1* | 8/2006 | Sawada ................ | G06N 3/008 700/245 |
| 2012/0212353 A1 | 8/2012 | Fung et al. | |
| 2013/0325202 A1 | 12/2013 | Howard et al. | |
| 2014/0242560 A1 | 8/2014 | Movellan et al. | |
| 2015/0100530 A1* | 4/2015 | Mnih ..................... | G06N 3/006 706/25 |
| 2015/0288944 A1* | 10/2015 | Nistico .................... | G06T 7/70 345/156 |

OTHER PUBLICATIONS

I. Iturrate, L. Montesano and J. Minguez, "Robot reinforcement learning using EEG-based reward signals," 2010 IEEE International Conference on Robotics and Automation, Anchorage, AK, USA, 2010, pp. 4822-4829, doi: 10.1109/ROBOT.2010.5509734. (Year: 2010).*

Alsheikh et al., "Machine Learning in Wireless Sensor Networks: Algorithms, Strategies, and Applications," In: IEEE Communications Surveys & Tutorials, May 2014 (24 pages).

Cai et al., "Coordinating Multi-Level Cognitive Assistance and Incorporating Dynamic Confidence Information in Driver-Vehicle Interfaces," Human Factors and Ergonomics in Manufacturing & Service Industries 22(5):437-449 (2012).

Castellaro et al., "An artificial intelligence approach to classify and analyse EEG traces," Clinical Neurophysiology 32:193-214 (2002).

Del R. Millan et al., "Brain-actuated interaction," Artificial Intelligence 159:241-259 (2004).

Distasio et al., "Use of Frontal Lobe Hemodynamics as Reinforcement Signals to an Adaptive Controller," PloS ONE 8(7):e69541 (2013), 16 pages.

International Search Report dated Jun. 21, 2017 in International Application No. PCT/US2017/026585.

Jia et al., "A Novel Semi-Supervised Deep Learning Framework for Affective State Recognition on EEG Signals," Bioinformatics and Bioengineering, Nov. 10-12, 2014, Boca Raton, FL.

Mnih et al., "Human-level control through deep reinforcement learning," Nature 518:529-533 (2015).

Mnih et al., "Playing Atari with Deep Reinforcement Learning," In: arXiv preprint. 2013 (9 pages).

Noor, "Potential of Cognitive Computing and Cognitive Systems," Open Engineering 5:75-88 (2015).

Nurse et al., "A Generalizable Brain-Computer Interface (BCI) Using Machine Learning for Feature Discovery," PLoS ONE 10(6):e0131328 (2015), 23 pages.

Teng et al., "Using EEG to Recognize Emergency Situations for Brain-controlled Vehicles," IEEE Intelligent Vehicles Symposium (IV), Jun. 28-Jul. 1, 2015. COEX, Seoul, Korea.

* cited by examiner

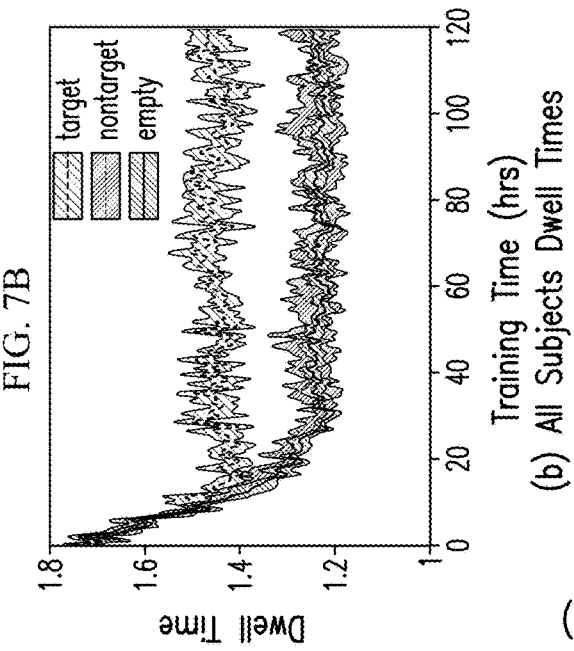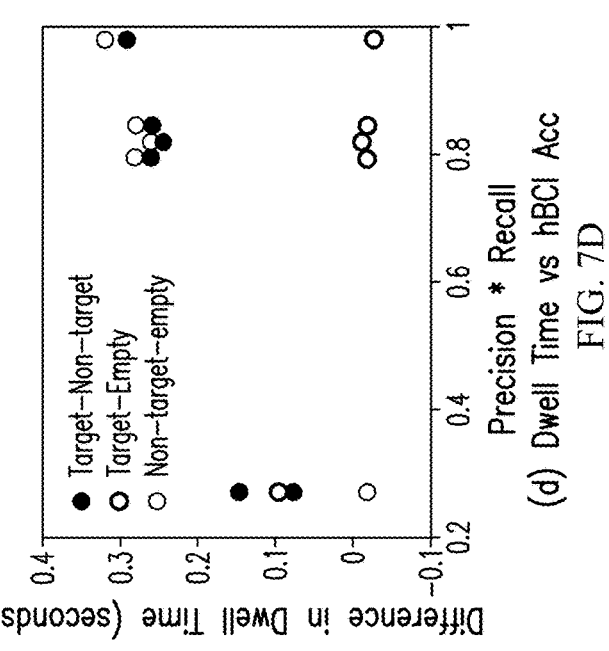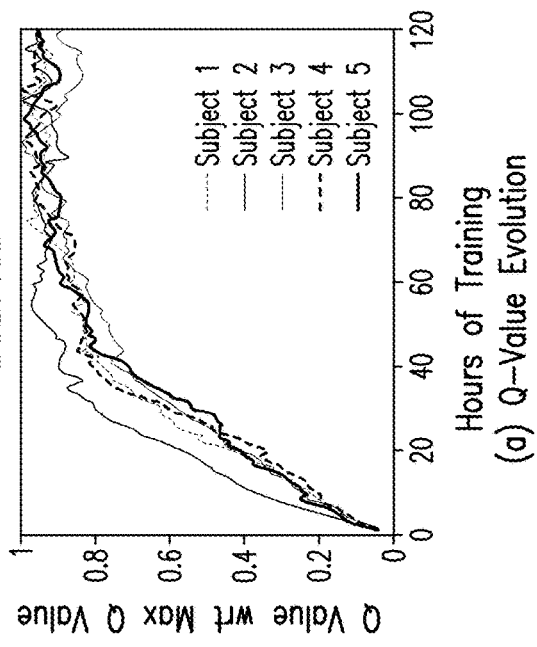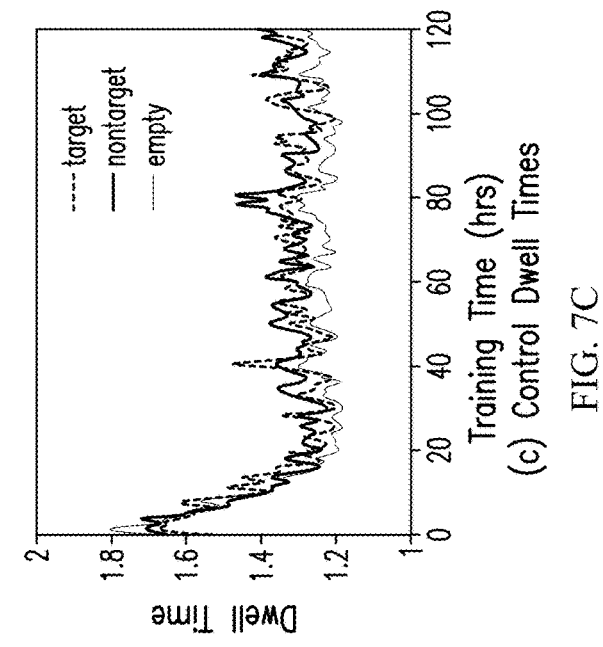
FIG. 7A (a) Q-Value Evolution
FIG. 7B (b) All Subjects Dwell Times
FIG. 7C (c) Control Dwell Times
FIG. 7D (d) Dwell Time vs hBCI Acc

SYSTEMS AND METHODS FOR DEEP REINFORCEMENT LEARNING USING A BRAIN-ARTIFICIAL INTELLIGENCE INTERFACE

CROSS REFERENCE TO RELATED APPLICATIONS

This application is a Continuation of International Patent Application No. PCT/US2017/026585, which was filed Apr. 7, 2017, which is related to, and claims priority from, U.S. Provisional Patent Application No. 62/320,137, entitled "Systems and Methods Providing a Brain-Artificial Intelligence Interface for User-Customized Autonomous Driving," which was filed on Apr. 8, 2016 and U.S. Provisional Patent Application No. 62/463,276, entitled "Systems and Methods for Deep Reinforcement Learning Using a Brain-Artificial Intelligence Interface," which was filed on Feb. 24, 2017, the entire contents of which are each incorporated by reference herein.

STATEMENT REGARDING FEDERALLY SPONSORED RESEARCH

This invention was made with government support under W911NF-11-1-0219 and W911NF-10-2-0022 awarded by Army Research Laboratory—Army Research Office. The government has certain rights in the invention.

BACKGROUND

With the increasing popularity of finding generalized artificial intelligences (AI) that interact with humans in all environments, such as a real-world environment, a virtual reality environment, and/or an augmented reality environment, certain deep reinforcement learning techniques have been considered in order to improve the user experience in such environments. Deep reinforcement learning systems can use reward/penalty signals that are objective and explicit to a task (e.g., game score, completion time, etc.) to learn how to successfully complete the task.

Certain reinforcement learning techniques can use reinforcement signals derived from performance measures that are explicit to the task (e.g., the score in a game or grammatical errors in a translation). However, in certain systems that involve significant subjective interaction between the human and artificial intelligence ("AI") (e.g., an autonomous vehicle experience), such systems can fail to consider how implicit signals of the human's preferences can be incorporated into the AI, particularly in ways that are minimally obtrusive.

There remains a need for a human-AI interaction system that includes reinforcement that is implicit and designed to adapt to subjective human preferences. There is also a need for incorporating implicit signals from a human's preferences into the AI in a minimally obtrusive manner.

SUMMARY

The present disclosure relates to systems and methods for providing a hybrid brain-computer-interface (hBCI) that can detect an individual's reinforcement signals (e.g., level of interest, arousal, emotional reactivity, cognitive fatigue, cognitive state, or the like) in response to objects, events and/or actions by an AI agent in an environment by generating implicit reinforcement signals for improving an AI agent controlling actions in the relevant environment, such as an autonomous vehicle. Although the disclosed subject matter is discussed within the context of an autonomous vehicle virtual reality game in the exemplary embodiments of the present disclosure, the disclosed system can be applicable to any other environment (e.g., real, virtual, and/or augmented) in which the human user's sensory input is to be used to influence actions, changes, and/or learning in the environment. For example, in addition to automobiles and VR/games, other applications for the present disclosure can include, but are not limited to, smart houses/rooms, mobile platforms with the ability to include AR headsets and/or displays, among other suitable applications. Furthermore, the systems and methods disclosed can use neural, behavioral, and/or physiological signals to inform deep reinforcement learning based AI systems to enhance user comfort and/or trust in automation.

In certain example embodiments, methods for detecting reinforcement signals of a user or an environment through at least one sensor are disclosed. The methods can include positioning the user in the environment including one or more objects, events, or actions for the user to sense, and collecting sensory information for the user from the at least one sensor. The methods further include identifying, using a processor, one or more reinforcement signals of the user or the environment based on the collected sensory information, altering an artificial intelligence agent to respond to the one or more reinforcement signals, and altering the environment based on the identification of the one or more reinforcement signals. In some example embodiments, the artificial intelligence agent can have control over properties in the environment.

In other example embodiments, a computer system for utilizing reinforcement signals of a user or an environment through at least one sensor to alter a behavior of an artificial intelligence agent is disclosed. The computer system includes a processor and a memory. The memory is operatively coupled to the processor and stores instructions that, when executed by the processor, cause the computer system to analyze the environment including objects, events, or actions therein; collect sensory information correlated to a state of the user or the environment from the at least one sensor; identify, via the processor, one or more reinforcement signals of the user or the environment based on the collected sensory information; alter the artificial intelligence agent to respond to the one or more reinforcement signals; and alter the environment based on the identification of the one or more reinforcement signals.

In other example embodiments, a system for detecting reinforcement signals of a user in one or more objects, events, or actions within an environment through at least one sensor is disclosed. The system includes a machine learning module operatively connected to the at least one sensor and configured to process sensory information for the user from the at least one sensor in response to the environment, and a controller operatively connected to the machine learning module. The machine learning module includes a processing circuit, a hybrid human brain computer interface (hBCI) module, and a reinforcement learning module.

BRIEF DESCRIPTION OF THE DRAWINGS

FIG. 5A illustrates a screen capture from the perspective of a passenger in the virtual environment. FIG. 5B illustrates a diagram illustrating the input to a disclosed artificial intelligence (AI) agent which shows a top-down perspective of the virtual environment.

FIGS. 7A-7D are graphs illustrating measurement results for the disclosed hBCI deep learning agent in accordance with the present disclosure.

Figure 1:
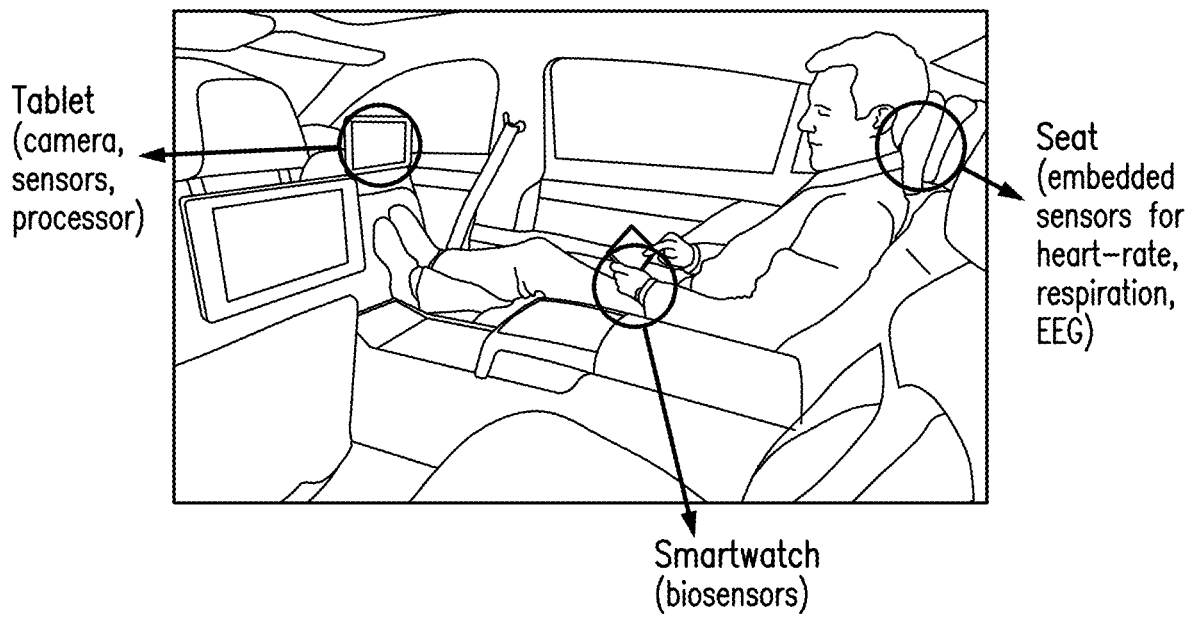
FIG. 1 is a diagram illustrating an exemplary environment in which the disclosed hybrid brain-computer-interface (hBCI) system can be used in accordance with the present disclosure.

Throughout the figures, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments.

DETAILED DESCRIPTION

The disclosed systems and methods provide a hybrid brain-computer-interface (hBCI) that can detect an individual's implicit reinforcement signals (e.g., level of interest, arousal, emotional reactivity, cognitive fatigue, cognitive state, or the like) in response objects, events, and/or actions in an environment by generating implicit reinforcement signals for improving an AI agent controlling, by way of example only, a simulated autonomous vehicle. As utilized herein, an "environment" can include a real-world environment, a virtual reality environment, and/or an augmented reality environment. Additionally, the disclosed subject matter provides systems and methods for using a brain-artificial intelligence (AI) interface to use neurophysiological signals to help deep reinforcement learning based AI systems adapt to human expectations as well as increase task performance. The disclosed subject matter can provide access to the cognitive state of humans, such as through real-time electroencephalogram (EEG) based neuroimaging, and can be used to understand implicit non-verbal cues in real-time. Furthermore, the systems and methods disclosed can use neurophysiological signals to inform deep reinforcement learning based AI systems to enhance user comfort and/or trust in automation.

In some embodiments, a cognitive state and user intent of a human user can be inferred in real-time using non-invasive neuroimaging and/or other sensory collection of behavioral or physiological responses. The neural, behavioral, and/or physiological signals obtained from such sensor collection can be used as a reinforcement signal to train a deep learning system to adapt its performance. According to one or more exemplary embodiments, cognitive states such as arousal, fatigue, cognitive workload, and perceived task error, can be captured through neural and peripheral signals and can be used by a deep reinforcement learner to optimize its value function in order to predict and/or reduce human stress and perceived error.

In some embodiments, a hybrid brain-computer interface (hBCI) can use non-invasive physiological signals (e.g., multi-channel EEG, pupillometry, heart rate, and galvanic skin response, camera, accelerometers on wearable sensors) that are acquired from the individual human user using sensory input devices in real-time to infer cognitive state and user intent of the human user. For example, a stress-inducing workload associated with the human user can be determined from the EEG imaging results using the power of theta band in fronto-central sites, while task error and orienting can be assessed using error-related negativity and P300 responses at similar sites. Error-Related Negativity can be a component that is generated in the medial frontal cortex, in the so called anterior cingulate cortex. These centrally positioned areas can have many connections with both the motor cortex and the prefrontal cortex. P300 can be a positive event-related brain potential that occurs approximately 300 ms after an event in the posterior parietal cortex, but possibly also at other locations. The hBCI system can forward such information as reinforcement signals to deep learning AI, in order to change AI behavior in order to result in higher subjective comfort of human occupants of a vehicle being driven by the deep learning AI system using the hBCI.

In an exemplary embodiment, a hybrid deep-learning system can be taught to fly and land an aircraft in a virtual environment (e.g., prepar3d). Such a hybrid deep learning (DL) involves 3-D perception and can entail semi-supervised or reinforcement learning using EEG signals signifying error/oddity. Such supervision can be obtained, in real-time, from the EEG scan of a human pilot, who is watching the DL system flying and landing the aircraft in the virtual environment. The hybrid DL network can obtain a reinforcement signal that is truly biological in nature and well-correlated with actual reward and/or punishment signals in the brain (e.g., dopamine, norepinephrine, etc.). In some embodiments, the reinforcement signals from the human pilot can be used as feedback to correct the DL virtual pilot's flight path. For example, as soon as the virtual DL pilot goes off-track or exhibits non-optimal behavior, neurophysiological signals from the real pilot watching a screen-feed can be obtained in real-time and fed to the DL network as a reinforcement signal. The neural signals can be correlated with error, surprise discomfort, as well as workload, and/or other markers to accelerate the DL system's learning process. The DL system can control the aircraft by simulating joystick movements, performing API-based direct scalar injections into the virtual environment (e.g., prepar3d or NEDE). The DL system can obtain screen output from the virtual environment as an input.

In some embodiments, the hBCI system can be used to impart expert knowledge to the DL network, in which an expert (e.g., a fighter ace) can observe an AI system perform a task (e.g., a flight maneuver). The hBCI system can pass the evoked neurophysiological response of error as a reinforcement signal to the AI system, such that over time the AI system acquires human expertise.

In some embodiments, a deep reinforcement AI agent can receive, as inputs, physiological signals from the human user and driving performance information associated with the simulated vehicle in the virtual environment. In some embodiments, the hBCI can also include a head-mounted display (e.g., a commercially available Oculus Rift, HTC Vive, etc.) and a plurality of actuators. The deep reinforcement AI learner can transmit instructions to the actuators in the hBCI's head-mounted display to perform certain actions.

For example, the actuators can be instructed to have the vehicle accelerate, brake, or cruise. The driving performance information can include positive reinforcement information and negative reinforcement information. The deep reinforcement AI agent can determine the virtual vehicle's actions in the virtual environment to identify positive and negative reinforcement information. For example, if the virtual vehicle is cruising behind another vehicle in the virtual environment, the deep reinforcement AI agent can associate such driving performance with positive reinforcement. If, for example, the virtual vehicle is involved with a collision with another vehicle in the virtual environment and/or the distance between the virtual vehicle and another vehicle exceeds a predetermined distance, the deep reinforcement AI agent can associate such driving performance with negative reinforcement.

Based on the driving performance determined from information in the virtual environment and the physiological signals detected from the human user, the deep reinforcement AI agent can calculate reward information. Rewards can be calculated as a score which is cleared if a collision occurs in the virtual environment. Such reward information can be transmitted as reinforcement to the deep reinforcement AI learner. Additionally, perception information (e.g., a sky camera view of the virtual environment) from the virtual environment can be transmitted to the deep reinforcement AI learner. Such perception information can include information about the position of the virtual vehicle and other objects of interest in the virtual environment.

In some embodiments, the AI agent can learn a braking strategy that maintains a safe distance from a lead vehicle, minimizes drive time, and can slow the simulated autonomous vehicle when encountering virtual objects of interest that are identified from hBCI signals of the passenger. Example disclosed method(s) allowing for such slowing down of the simulated autonomous vehicle can provide the simulated passenger approximately at least 20% more time to gaze at virtual objects in the virtual environment they find interesting, compared to objects that they have no interest in (or distractor objects and/or events). The disclosed subject matter provides systems and methods to use an hBCI to provide implicit reinforcement to an AI agent in a manner that incorporates user preferences into the control system.

In some embodiments, the disclosed subject matter can use decoded human neurophysiological and ocular data as an implicit reinforcement signal for an AI agent tasked with improved or optimal braking in a simulated vehicle. In an exemplary embodiment, the agent can be tasked with learning a braking strategy that integrates safety with the personal preferences of the passenger. Passenger preferences can be reflected in neural (e.g., electroencephalography), respiratory (e.g., measured from heart rate sensors), and ocular signals (pupillometry and fixation dwell time information obtained by cameras monitoring the human user) that are evoked by objects/events in the simulated environment that grab their interest. These sensory input signals can be integrated and decoded to construct a hybrid brain-computer interface (hBCI) whose output represents a passenger's subjective level of interest, arousal, emotional reactivity, cognitive fatigue, cognitive state, or the like in objects and/or events in the virtual environment. The disclosed system can be a hBCI by utilizing brain-based physiological signals measured from the passenger and/or user, such as EEG, pupillometry, and gaze detection, using sensory input devices. By integrating physiological signals that can infer brain state based on a fusion of modalities (e.g., other sensory input signals) other than direct measurement of brain activity, the disclosed system can be a hybrid BCI (hBCI).

In some embodiments, the hBCI system can be made more robust by adding a semi-supervised graph-based model for learning visual features that represent objects of interest to the specific passenger. In some embodiments, this semi-supervised graph-based model of the objects is called Transductive Annotation by Graph (hereinafter also referred to as "TAG"). This graph-based model can reduce errors that can result from the neural-ocular decoding and can extrapolate neural-ocular classified object preference estimates from the hBCI to generate additional reinforcement signals. Such extrapolation can be used to generate large number of labels required for a deep learning AI system.

An exemplary environment in which the disclosed system is used is illustrated in FIG. 1. A human user can sit in the backseat of a vehicle and be surrounded by several different sensory input devices that can be used to collect sensory input signals from the human user. The sensory input devices can include, but are not limited to, a tablet computing device (e.g., iPad) or any other mobile computing device including cameras, sensors, processors, wearable electronic devices which can include biosensors (e.g., smart watch, Apple Watch, Fitbit, etc.), heart rate monitors and/or sensors, and/or an EEG. These sensors can collect different types of sensory input information from the human user and transmit that information to the machine learning module of the hBCI system illustrated in FIG. 2.

Although the disclosed subject matter is discussed within the context of an autonomous vehicle virtual reality game in the exemplary embodiments of the present disclosure, the disclosed system can be applicable to any other environment, such as, for example, a real-world environment, an augmented reality environment, and/or a virtual reality environment in which the human user's sensory input is to be used to influence actions in a virtual reality environment.

Figure 2:
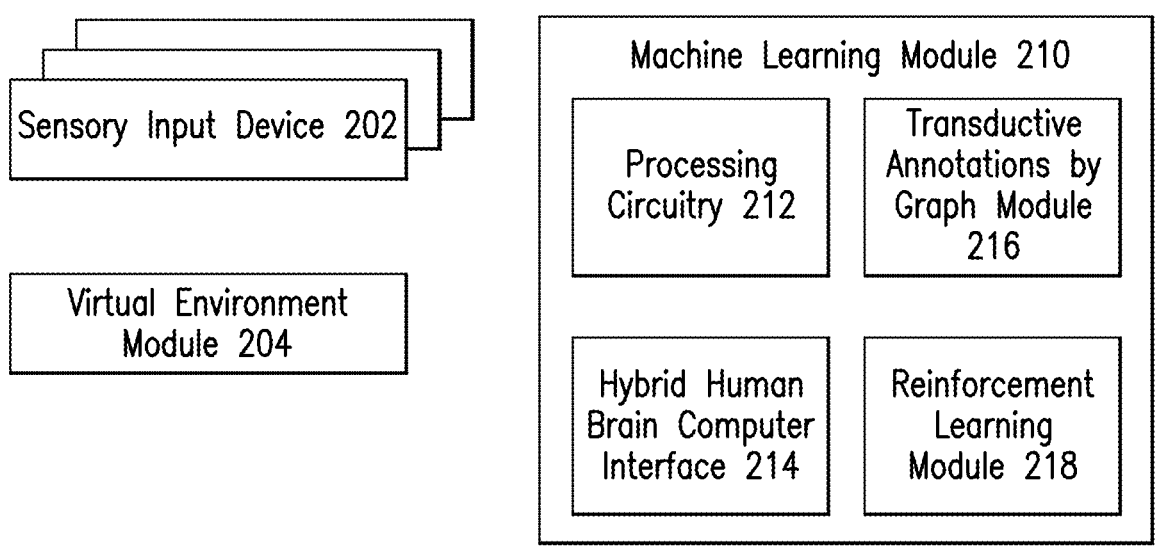
FIG. 2 is a block diagram illustrating a system level diagram of the disclosed hBCI system in accordance with the present disclosure.

FIG. 2 is a block diagram illustrating a system level diagram of the disclosed hBCI system 200. The hBCI system 200 can include one or more sensory input devices 202 as shown in FIG. 1, a machine learning module 210 that can process input signals from sensory input device(s) 202 to reinforce driving behavior using a deep reinforcement network, and an environment module 204 that can generate a virtual environment in which the AI agent can drive a simulated autonomous vehicle using the determined reinforced driving behavior.

In some embodiments, the machine learning module 210 can include processing circuitry 212, a hybrid human brain computer (hBCI) module 214, a transductive annotations by graph (TAG) module 216, and a reinforcement module 218, as described in greater detail below with connection to FIGS. 3 and 4. In some embodiments, hBCI module 214, TAG module 216, and reinforcement module 218 can be implemented on separate devices. In some embodiments, hBCI module 214 can be implemented on a device that can perform the initial physiological signal measurement and can analyze it using the hBCI. In some embodiments, TAG module 216 can use TAG along with the full object database to construct labels. In some embodiments, reinforcement module 218 can be implemented on another device that can execute the virtual environment and can conduct the reinforcement learning disclosed herein. In some embodiments, each of the hBCI module 214, the TAG module 216, and/or the reinforcement module 218 can be implemented on separate machines, while in other embodiments each of the hBCI module 214, the TAG module 216, and the reinforcement module 218 can be implemented on the same device.

Figure 3:
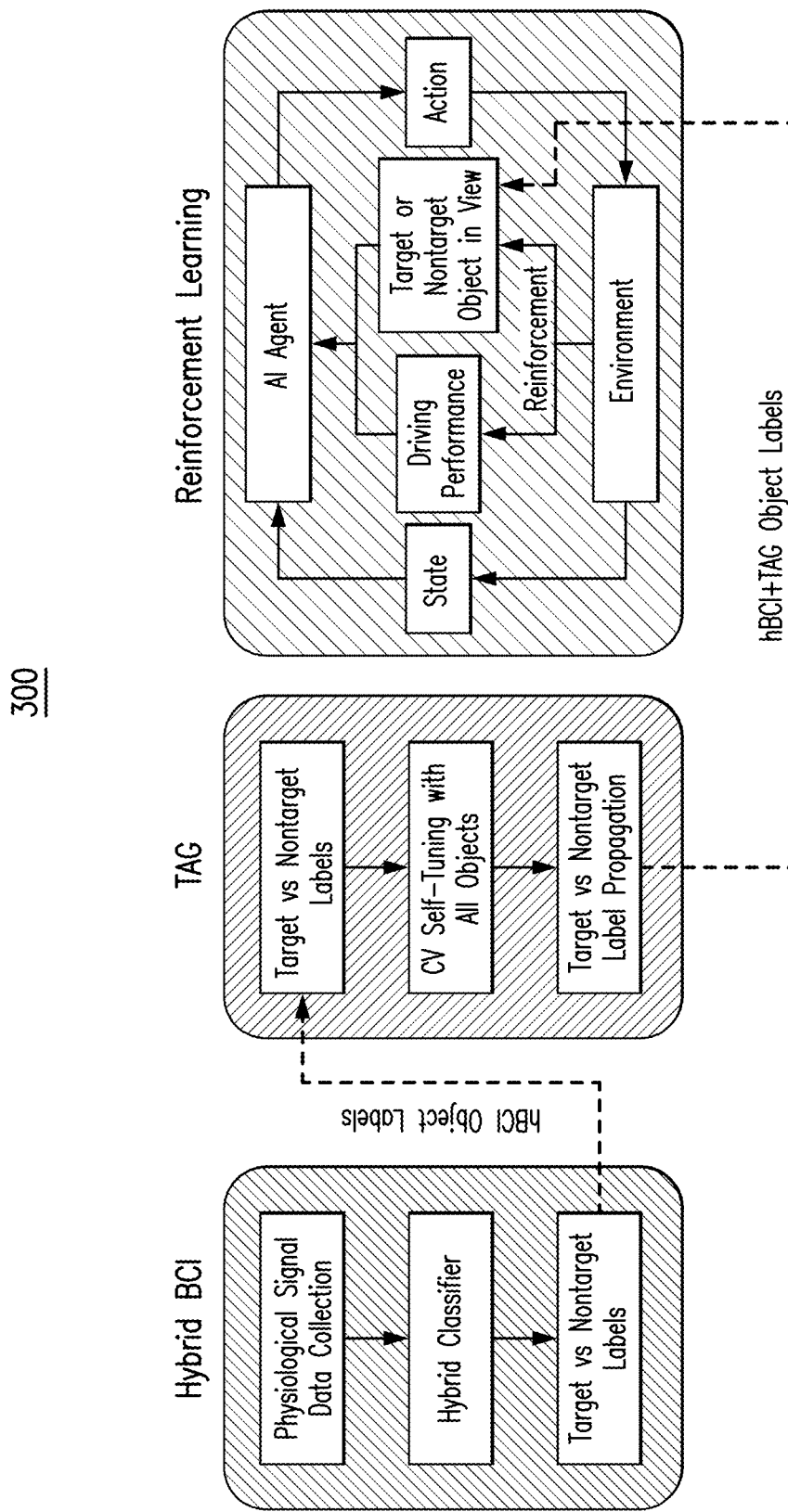
FIG. 3 is a block diagram illustrating a system level diagram of the disclosed machine learning modules in accordance with the present disclosure.

FIG. 3 is a block diagram illustrating a system level diagram of the disclosed machine learning module 300 in accordance with the present disclosure. Machine learning module 300 can correspond to machine learning module 210 of FIG. 2. The machine learning module 300 can include a hBCI submodule, a TAG module, and a reinforcement learning module. The hBCI module can use a hybrid classifier to fuse and decode physiological signals from the subject and identify target or non-target labels from a subset of the object database. As shown in FIG. 3, the TAG module can use those hBCI object labels, generated by the hBCI module, as features along with a computer (CV) system to identify targets and non-targets from a large dataset of objects. The reinforcement learning module can populate a virtual environment with objects from the large dataset and use those labels generated by the TAG module to elicit reinforcement to the AI agent in order to train the AI agent to keep targets in view for longer periods of time.

In some embodiments, the machine learning module 300 can be used to capture neural and physiological signatures of subject preferences, tune and extrapolate these preferences over objects in a given environment, and reinforce driving behavior using a deep learning reinforcement network. For example, to reinforce driving behavior using such a deep learning reinforcement network, physiologically derived information from an hBCI can be used to infer subject interest in virtual objects in the virtual environment, the virtual objects can be classified as targets or non-targets, and these neural markers can be used in a transductive annotation by-graph (TAG) semi-supervised learning architecture to extrapolate from a small set of target examples and categorize a large database of objects into targets and non-targets. In some embodiments, these target and non-target objects can be placed in a virtual environment that the AI system's simulated autonomous vehicle can navigate. When these virtual objects are in view of the simulated autonomous vehicle, positive or negative reinforcement can be sent to the AI learning agent of the reinforcement learning module. In this manner, the behavior of the AI agent can be differentiated when driving near targets and non-targets. For example, the AI agent can be configured to keep within visual distance of targets for a longer period of time.

A virtual environment, generated by the environment module 204, can be used to train the AI agent of the reinforcement learning module. In an exemplary embodiment, a simulated autonomous passenger vehicle is driven behind a simulated lead car that can follow a straight path and can brake stochastically. Each independent driving run can start from the same location in the virtual environment and can end immediately if the simulated autonomous passenger vehicle lags too far behind the lead car (e.g., maintains a distance larger than predetermined maximum distance) or follows dangerously close (e.g., maintains a distance less than predetermined minimum distance). The AI agent can be configured to increase speed, maintain speed, or decrease speed of the simulated autonomous passenger vehicle. In some exemplary embodiments, there can be alleys on either side of the driving path and a certain percentage (e.g., 40%) of these alleys can include virtual objects. In an exemplary embodiment, the targets and non-targets were randomly placed in the virtual environment by the environment module 204 in a 1:3 ratio of targets to non-targets.

In some embodiments, the subjective preferences of the human passenger can be tracked by decoding physiological signals of the human orienting response. Orienting can be important to decision-making since it is believed to be important for allocating attention and additional resources, such as memory, to specific objects/events in the environment. Salience and emotional valence can affect the intensity of the orienting response. Orienting can be expressed neurophysiologically as evoked EEG, specifically in a P300 response. It can also be associated with changes in arousal level, seen in the dilation of the pupil, as well as changes in behavior, for example physically orienting to the object/event of interest.

In some embodiments, reinforcement learning can require a large number of samples (e.g., millions of samples comprising over one hundred hours of data) to train a network to generate a reinforcement learning model. In some embodiments, physiological signals can be used as reinforcement, but due to the large amount of training data needed, alternatives to training the network can be used to acquire the requisite information. For example, instead of using real time physiological reinforcement to train the network, target object labels derived from subjects can be utilized in a previous experiment and can be extrapolated to new objects using the TAG computer vision system. In this manner, a model can be generated that can predict subject preferences but can expand the training dataset so that an accurate model can be generated in the virtual environment.

In some embodiments, the subjects (e.g., human user) can be driven through a grid of streets and asked to count image objects of a pre-determined target category. As a subject is driven through a virtual environment, the subject can constantly make assessments, judgments, and decisions about the virtual objects that are encountered in the virtual environment during the drive. The subject can act immediately upon some of these assessments and/or decisions, but several of these assessments and/or decisions based on the encountered virtual objects can become mental notes or fleeting impressions (e.g., the subject's implicit labeling of the virtual environment). The disclosed system can physiologically correlate such labeling to construct a hybrid brain-computer interface (hBCI) system for efficient navigation of the three-dimensional virtual environment. For example, neural and ocular signals reflecting subjective assessment of objects in a three-dimensional virtual environment can be used to inform a graph-based learning model of that virtual environment, resulting in an hBCI system that can customize navigation and information delivery specific to the passenger's interests. The physiological signals that were naturally evoked by virtual objects in this task can be classified by an hBCI system which can include a hierarchy of linear classifiers, as illustrated in FIG. 3. The hBCI system's linear classifiers along with Computer Vision (CV) features of the virtual objects can be used as inputs to a CV system (e.g., TAG module). Using machine learning, neural and ocular signals evoked by the virtual objects that the passenger encounters in the virtual environment, during the drive in the simulated autonomous vehicle, can be integrated for the disclosed system to infer which virtual object(s) can be of subjective interest to the passenger. These inferred labels can be propagated through a computer vision graph of virtual objects in the virtual environment, using semi-supervised learning, to identify other, unseen objects that are visually similar to the labeled ones.

In some embodiments, the combined hBCI and TAG system can output a score indicating the system's level of certainty that a virtual object is a target. For example, an uncertainty measure can be inferred through the classifier output. A tolerance level can be determined such that the classifier output scores above a minimum predetermined threshold that are considered targets and below a predetermined minimum threshold that are considered non-targets. By adjusting one or more of the predetermined maximum and minimum thresholds, the classifier can be adjusted to yield a higher or lower false positive rate.

In some embodiments, the TAG module can include a graph-based system to identify virtual target objects that are of interest to the subject (e.g., human user). For example, the TAG module can first tune the target set predicted by the hBCI for each subject and can then extrapolate these results to all the unseen objects in the environment. To accomplish this, the TAG module can construct a CV graph of image objects in the environment, using their similarity to determine the connection strength between nodes. The estimated similarity for each pair of objects can be based not only on the features of that pair but also on the distribution of the features across all objects in the CV graph. Upon performing such tuning using CV graphs, the TAG module can propagate the hBCI+TAG object (e.g., target and non-target) labels to the reinforcement learning module, as shown in FIG. 3.

In some embodiments, the reinforcement learning module can train the AI agent to navigate the environment. For example, a deep reinforcement learning paradigm can be used that optimizes the function for learning the correct action under a given state S using the equation:

$$Q_\pi(s,a) = E[R_1 + \gamma R_2 + \ldots | S_0 = s, A_0 = a, \pi] \quad (1)$$

where $E[R_1]$ is the expected reward of the next state and action pair, and subsequent state action pairs are discounted by $\gamma$ compounding. This Q-function can be approximated by the parameterized value: $Q(s, a; \theta_t)$, where $\theta_t$ is the parameterized representation of $\pi$. By utilizing reinforcement learning, the network can generate a model that predicts future states and future rewards in order to optimally accomplish a task. Double-deepQ learning techniques can be used to update the network weights to this parameterized function after taking action $A_t$ at state $S_t$ and observing the immediate reward $R_{t+1}$ and state $S_{t+1}$ using the equation:

$$\theta_{t+1} = \theta_t + \alpha(Y_t^{DQ} - Q(S_t, A_t; \theta_t))\nabla_{\theta_t} Q(S_t, A_t; \theta_t) \quad (2)$$

where $\alpha$ is a scalar step size and the target $Y_t^{DQ}$ is defined as:

$$Y_t^{DQ} = R_{t+1} + \gamma Q\left(S_{t+1}, \arg\max_a Q(S_{t+1}, a; \theta_t); \theta_t\right) \quad (3)$$

By implementing this form of learning, the reward value can be adjusted to combine explicit reinforcement of driving performance with physiologically derived reinforcement to influence the behavior of the AI-controlled simulated autonomous vehicle.

In some embodiments, the deep network used to parameterize the policy function $\pi$ E of the Q-function can be created using a multi-layer (e.g., 5 layers) deep network. In an exemplary embodiment, the input to the neural network can include the 3×64×64 grayscale image series state input. The first hidden layer can convolve 32 filters of 8×8 with stride 4 with the input image and can apply a rectifier nonlinearity. The second hidden layer can convolve 64 filters of 4×4 with stride 2, and can again be followed by a rectifier nonlinearity. This can be followed by a third convolutional layer that can convolve 64 filters of 3×3 with stride 1 followed by a rectifier. The final hidden layer can be fully-connected and can include 512 rectifier units.

The output layer can be a fully-connected linear layer with a single output for each valid action (e.g., increasing, maintaining, and decreasing speed of the simulated autonomous vehicle). By using the convolutional layers in the network, the network can be able to have computer vision capabilities which can interpret the input state image and identify objects in the image such as the positions of the simulated autonomous vehicle and the virtual object(s).

Figure 4:
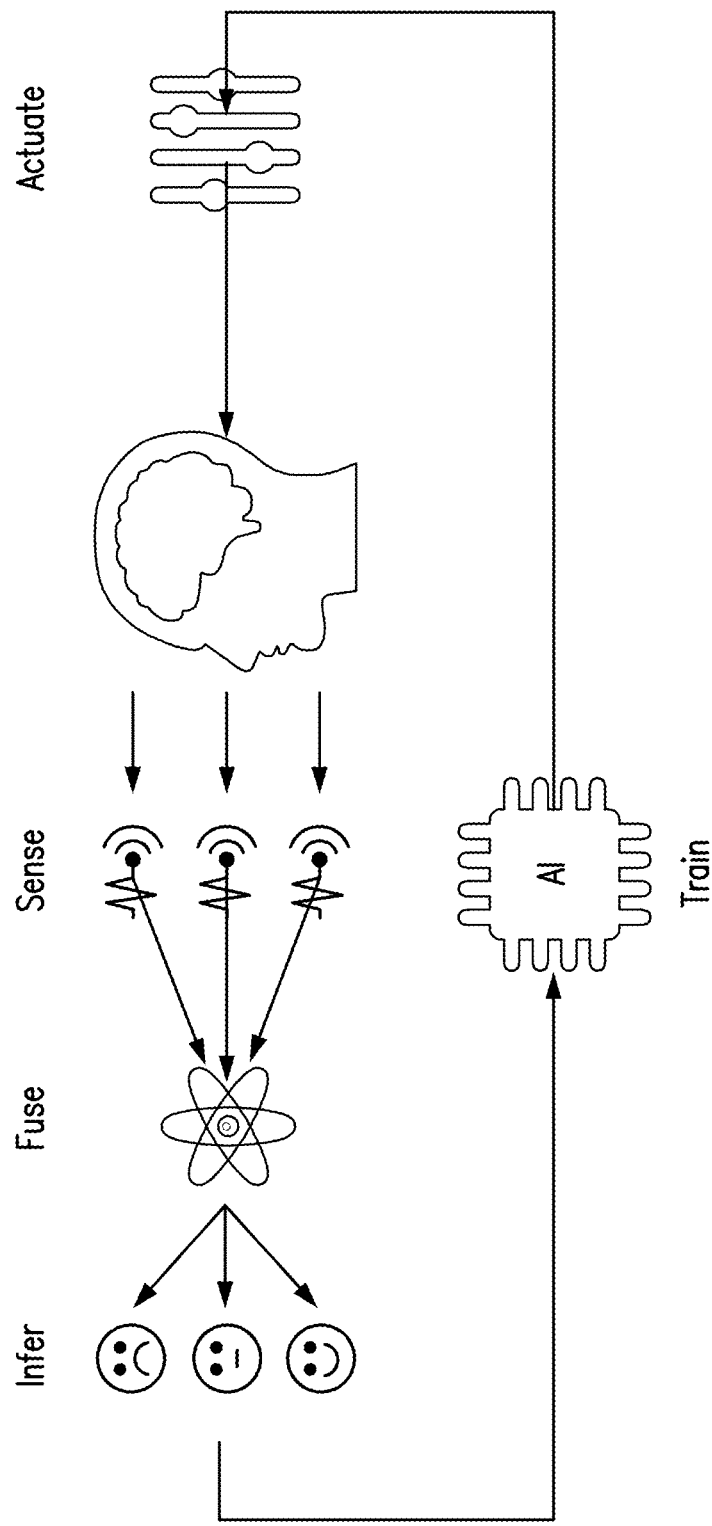
FIG. 4 is a diagram illustrating a process by which the disclosed subject matter can be used to infer the passenger's psychological state in accordance with the present disclosure.

FIG. 4 is a diagram illustrating a process by which the disclosed subject matter can be used to infer the passenger's psychological state. Sensory input devices monitoring the passenger and/or subject can measure and/or sense the subject's reactions. By fusing and/or compositing the various different reactions that are measured from the subject and correlating it with the actions and/or events occurring in the environment that the subject is experiencing, the AI agent of the reinforcement learning module (e.g., reinforcement learning module 210 as shown in FIGS. 2 and 3) can infer a cognitive state and user intent of the subject, hereinafter also referred to as the passenger's psychological state. For example, the AI agent controlling the simulated autonomous vehicle can be informed by the psychological state of the subject being driven in the simulated autonomous vehicle and experiencing the environment. The AI agent can be adjusted based on reinforcement from the inferred psychological state of the subject such that the AI agent's actions are affected by the passenger's psychological state. For example, upon determining which types of objects that the subject is interested in, the AI agent can determine when to slow down, brake, and accelerate the simulated autonomous vehicle. The AI agent can adjust these actions based on the inferred interest of the subject in the objects and/or surroundings in the environment. The subject's neurological and/or ocular signals can stem from naturally occurring reactions of the subject. The disclosed system can collect such information provided passively by the subject as he sits in the seat of the simulated autonomous vehicle experiencing the simulated drive in the environment. The AI agent can be trained to allow the subject to view the type of objects that the subject shows an interest in. By measuring and factoring in the different measured ocular and neurological signals of the subject, the AI agent can modify the behavior of the simulated autonomous vehicle to the individual's preferences to inform the simulated autonomous vehicle about the needs of the subject. By customizing the actions of the simulated autonomous vehicle to the individual subject, the simulated autonomous vehicle driving can be customized to the individual passenger and can result in increased comfort, trust, and user acceptance in the AI agent.

Figure 5A:
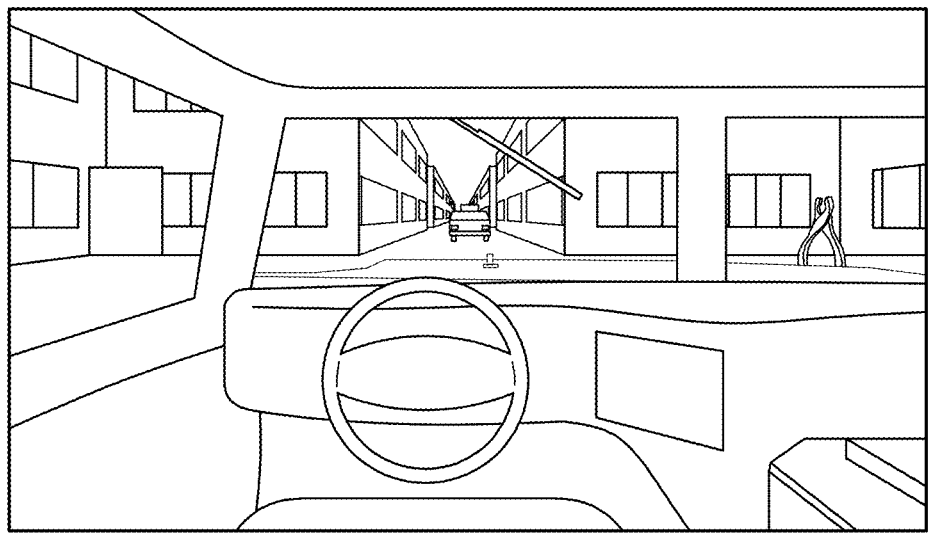
FIGS. 5A and 5B illustrate different views of a virtual environment used with the disclosed subject matter in accordance with the present disclosure.
Figure 5B:
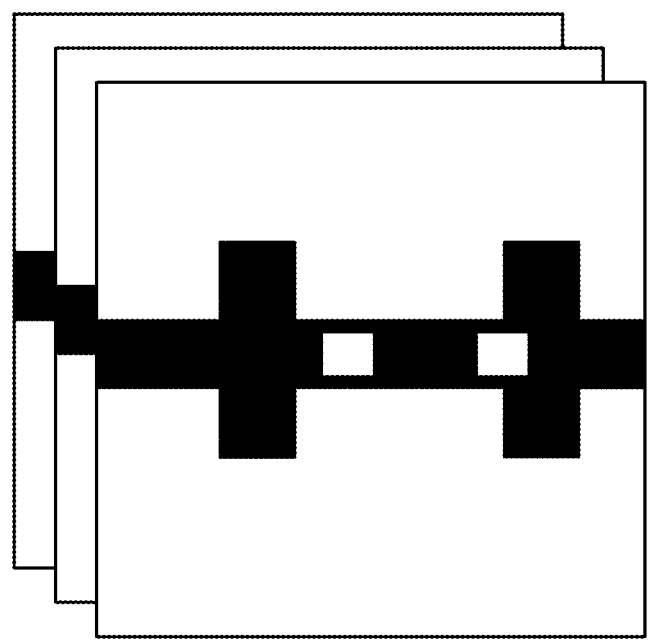

FIGS. 5A and 5B illustrate different views of a virtual environment used with the disclosed subject matter. FIG. 5A illustrates a screen capture from the perspective of a passenger in the virtual environment. Objects can be seen in the alleys to the side of the car. FIG. 5B illustrates a diagram illustrating the input to a disclosed artificial intelligence (AI) agent which shows a top-down perspective of the virtual environment. The two cars are seen on the road as white blocks while objects in the alleys are represented by markers with one luminance corresponding to targets and one luminance corresponding to non-targets.

In some embodiments, the AI agent of the reinforcement module can assess the state using a top-down view of the virtual environment surrounding the passenger simulated autonomous vehicle as shown in FIG. 5B. Multiple (e.g., 3) successive video frames (e.g., a 3×64×64 px grayscale image series) can be used as the state input, S, to the deep learning network. With this image series, the AI agent can identify or "see" the virtual path and/or road, the position of both vehicles (e.g., the lead car and the passenger simulated autonomous vehicle), and orb representations of virtual objects at the side of the path and/or road. The luminance of these orb representations of the virtual objects can be based on their hBCI+TAG label as a target or non-target. When the passenger simulated autonomous vehicle is near any of these orbs, a reinforcement signal can be elicited, as described in greater detail below.

In some embodiments, the AI agent can be rewarded as long as the simulated autonomous passenger vehicle follows the lead car within predetermined distance thresholds. The AI agent can receive a positive reinforcement for staying within the predetermined distance thresholds and a negative reinforcement when it violates these predetermined distance thresholds (e.g., +1 and −10 reinforcement, respectively). To include physiological signals into the reinforcement process, the AI agent can be awarded an additional reward (or punishment) based on the neurophysiological response evoked by image objects within the visual distance of the passenger car. For example, an object classified by the hBCI+TAG system as a target object can yield a reward while those classified as non-target objects can yield a penalty. The magnitude of reward and the magnitude of penalty can be balanced according to the prevalence of targets and non-targets in the environment (e.g., +3 and −1 reinforcement respectively). Some objects can be misclassified by hBCI and can yield the wrong reinforcement (false positives and false negatives). The accuracy of each subject's classifier can be determined as the maximum value of a product of precision and recall across all classification thresholds. The immediate reward, $R_{t+1}$, can be the sum of all reinforcement values that are accumulated in the current rendered frame, where the reinforcement values can be calculated by the following equations:

$$r_1 = \begin{cases} +1, & \text{if } 2 < d < 20 \\ -10, & \text{else} \end{cases} \quad (4)$$

$$r_2 = \begin{cases} +3, & \text{if } WVD_a \wedge w_a < TPR \\ -1, & \text{if } WVD_a \wedge w_a > TPR \\ 0, & \text{else} \end{cases} \quad (5)$$

$$r_3 = \begin{cases} -1, & \text{if } WVD_b \wedge w_b > FPR \\ +3, & \text{if } WVD_b \wedge w_b < FPR \\ 0, & \text{else} \end{cases} \quad (6)$$

$$R_{t+1} = f(w_1 r_1 + w_2 r_2 + w_3 r_3) \quad (7)$$

where d is the distance between the passenger simulated autonomous vehicle and the lead car (e.g., at distances between 2 and 20, the AI was at a "safe distance" from the lead car). $WVD_a$ and $WVD_b$ can be true when the passenger simulated autonomous vehicle is within visual range of a target and a non-target object respectively and false otherwise. TPR can be the true positive rate and FPR can be the false positive rate of the hBCI+TAG system derived from the subject and ω can be a uniformly distributed random number between 0 and 1 chosen at each incidence of WVD being true. In subsequent instantiations, the different reinforcement schemes ($r_1 \ldots r_n$) can be weighted differently and the final value can be used in a function such as a sigmoid in order to squash the reinforcement value limits. In an exemplary embodiment, the reinforcement schemes can be equal at $\omega_1 = \omega_2 = \omega_3 = 1$ and do not use a squashing function. The results of the hBCI+TAG results in this exemplary embodiment are illustrated in Table 1 below.

TABLE 1

Subject hBCI + TAG Results

| Subject | 1 | 2 | 3 | 4 | 5 |
|---|---|---|---|---|---|
| TPR | 0.834 | 0.982 | 1.000 | 0.874 | 0.845 |
| FPR | 0.012 | 0.949 | 0.006 | 0.011 | 0.007 |
| Precision | 0.952 | 0.275 | 0.980 | 0.966 | 0.970 |
| Recall | 0.834 | 0.982 | 1.000 | 0.874 | 0.845 |
| Precision * Recall | 0.794 | 0.270 | 0.980 | 0.845 | 0.820 |

Figure 6:
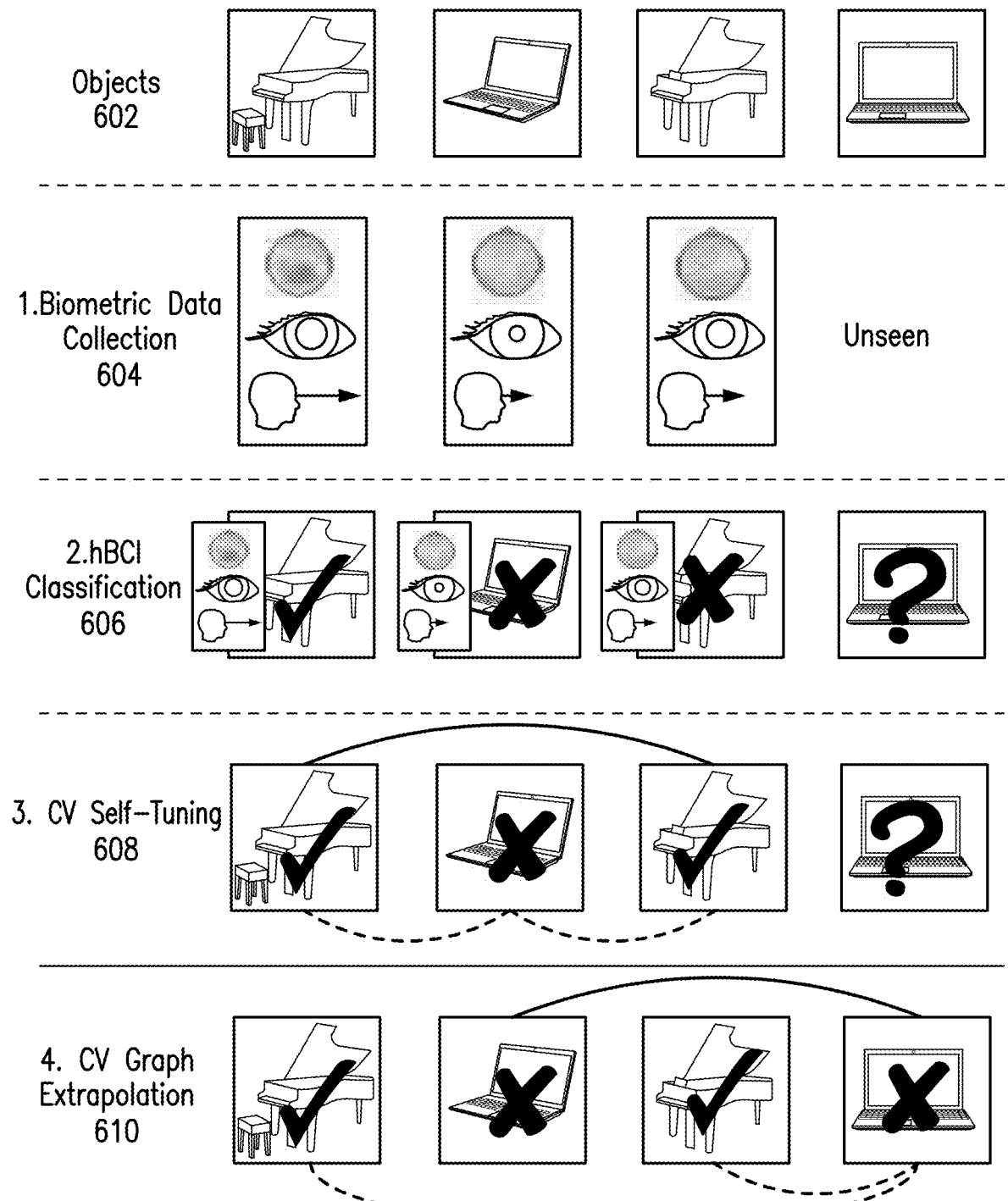
FIG. 6 is a diagram illustrating an example of hBCI and computer vision (CV) labeling of objects performed by the disclosed system in accordance with the present disclosure.

FIG. 6 is a diagram illustrating an example of hBCI and computer vision (CV) labeling of virtual objects. Row 602 of FIG. 6 illustrates virtual objects that can be placed in the virtual environment in an exemplary embodiment, and subjects can be asked to prefer (e.g., count) one target category of virtual object (e.g., grand pianos in this example). Rows 604, 606, 608, and 610 illustrate processes by which the virtual objects can be labeled as targets (illustrated with green checks in FIG. 6) or non-targets (illustrated with red X's in FIG. 6). The labels can then be used to determine the reinforcement signal sent to the deep learning system such that a target-labeled virtual object in view of the passenger simulated autonomous vehicle can result in an increased reward. Orange outlines (e.g., as shown in row 604 of FIG. 6) can indicate that the data and/or label was generated. As shown in row 604 of FIG. 6, the hBCI and computer vision can determine that the subject has viewed some (but not all) of the virtual objects. EEG, pupil dilation, and dwell time data can be collected from the sensory input devices monitoring the subject to determine whether the subject viewed each virtual object.

As shown in row 606 of FIG. 6, the hBCI and computer vision can generate a subject-specific hBCI classifier to convert these biometric signals into a target and/or non-target labels. As shown in row 608 of FIG. 6, the hBCI and computer vision can use the TAG CV to "self-tune" the labels, adjusting them so that the predicted targets can be strongly connected to each other but not to the predicted non-targets. Blue lines (as shown in row 608 of FIG. 6) can show the level of connection in the CV graph such that thick solid lines can represent strong connections and thin dotted lines represent weak connections. As shown in row 610 of FIG. 6, the hBCI and computer vision can propagate the tuned labels through the CV graph to generate labels for the unseen objects.

FIGS. 7A-7D are graphs illustrating measurement results for the disclosed hBCI deep learning agent. FIGS. 7A-7D report results for 5 different subjects. Four of these subjects showed a learned behavior based on their hBCI+TAG preferences while one subject did not show preference learning due to low SNR of the hBCI+TAG classification. Data from all subjects show a converging growth in Q-values during training, indicating that the AI agent is learning to accomplish the driving task (as illustrated in FIG. 7A). With the integration of hBCI reinforcement into deepQ, the behavior of the AI agent can be tuned to each individual's subjective interest, indicating whether the subject viewed each object as a target or non-target.

One metric of success is the dwell time for each object type, which is the number of seconds that the passenger car stays within visual distance of an object. Results show that the AI agent can differentiate between targets and non-targets, learning how to keep targets within view for a longer period of time (as illustrated in FIG. 7B). As a control, the true positive rate and false positive rate can be set to 0.5 to simulate a subject with an hBCI+TAG output that is random and illustrate that this control subject does not have significantly different dwell times between targets, non-targets, and empty halls (as illustrated in FIG. 7C). The success of the system in spending more time dwelling on targets (e.g., relative to non-targets or empty halls) depends on the product of precision and recall of the hBCI classifier (as illustrated in FIG. 7D). In particular, higher hBCI classification accuracy can yield larger differences in dwell time between targets and non-targets.

As illustrated by the results in FIGS. 7A-7D, Q value evolution over training time indicates that all subjects have converged to a relatively stable Q value which indicates that training has plateaued. According to the results shown in FIGS. 7A-7D, an average dwell time between targets and non-targets indicates approximately a 20% increase in dwell time between targets and non-targets across subjects. According to the results shown in FIGS. 7A-7D, a control subject can be used to determine how the AI agent behaved when a hBCI+TAG that outputted random classification values is used. The results show that there is little separation of dwell times between targets, non-targets, and empty halls. Comparing the product of precision and recall with the difference in dwell time shows that subjects with lower precision and recall product in the hBCI+TAG have a smaller separation of dwell times between targets and non-targets.

In some embodiments, a three-tiered machine learning module (as illustrated by FIG. 3) is provided for decoding neural and ocular signals reflecting a human passenger's level of interest, arousal, emotional reactivity, cognitive fatigue, cognitive state, or the like and mapping these into a personalized optimal braking strategy. The machine learning module determines an optimal braking strategy for the simulated autonomous vehicle that maintains a safe distance from a lead vehicle, slows the vehicle when objects of specific interest to the passenger are encountered during the drive, and ignores objects that do not interest the passenger (e.g., the human user). The human-machine interaction that communicates passenger preferences to the AI agent can be implicit and via the hBCI.

For example, the human user does not need to communicate their preferences overtly (e.g., with a press of a button). Instead, preferences can be inferred via decoded neural and/or ocular activity. A semi-supervised CV-based learning can be used to increase the prevalence of the reinforcement signals while also mitigating the relatively low signal to noise ratio (SNR) of the human neurophysiological data. For example, only a few evoked neural and/or ocular responses can be required to generate a model of the passenger's preferences. A double deepQ reinforcement architecture can be used to converge, in 4 out of 5 subjects (due to hBCI+TAG performance), to a braking strategy which substantially lengthens the time passengers can gaze at objects that are consistent with their individual interest.

In some embodiments, the hBCI system can be extended to other types of personalization while incorporating other signals of individuals' cognitive state. For example, the hBCI system can be used to customize each human user's experience in a simulated autonomous vehicle based on his/her subjective level of comfort and/or arousal/trust. The example of braking and extending gaze for a passenger is just one way this approach can be used to tune preferences in an autonomous vehicle. For example, it is not just important that the vehicle drive safely, but also that the ride is "comfortable" for the individual. The degree of comfort can be a subjective metric that is specific to a particular human passenger and might be observed via changes in arousal, stress level, and emotional valence, amongst other physiological and cognitive factors. The importance of the AI recognizing and acting upon, and/or even predicting human preferences, can be important not only as an interface but for development of a "trusted relationship" between the human and machine.

In some embodiments, the disclosed system can utilize EEG, pupil dilation, and eye position data as physiological signals used to train the classifier to distinguish targets from non-targets. In some embodiments, additional physiological and behavioral signals can be fused in the hBCI to infer cognitive and emotional state. For example video from a camera can be used to track micro-expressions as well as electrodermal activity (EDA) as measures of stress and emotional state. For applications where scalp EEG is not practical, additional alternative sensory modalities can be used to integrate the less obtrusive sensing modalities in a way that provides the necessary precision and recall to train reinforcement learning agents.

In some embodiments, the disclosed system can be operated in an open loop. For example, the disclosed system cannot obtain new training data from the environment during the reinforcement process.

In some embodiments, the disclosed system can be operated in a closed loop. For example, the AI agent's behavior can be modified while new data is introduced into the system. For example, after the AI agent has modified its behavior to slow down when it approaches non-targets, the hBCI can perform more accurately as the subject is more likely to attend to targets in a future run. This new data can be used and propagated in the TAG module to train the AI agent again and improve the differentiation between targets and non-targets.

Figure 8:
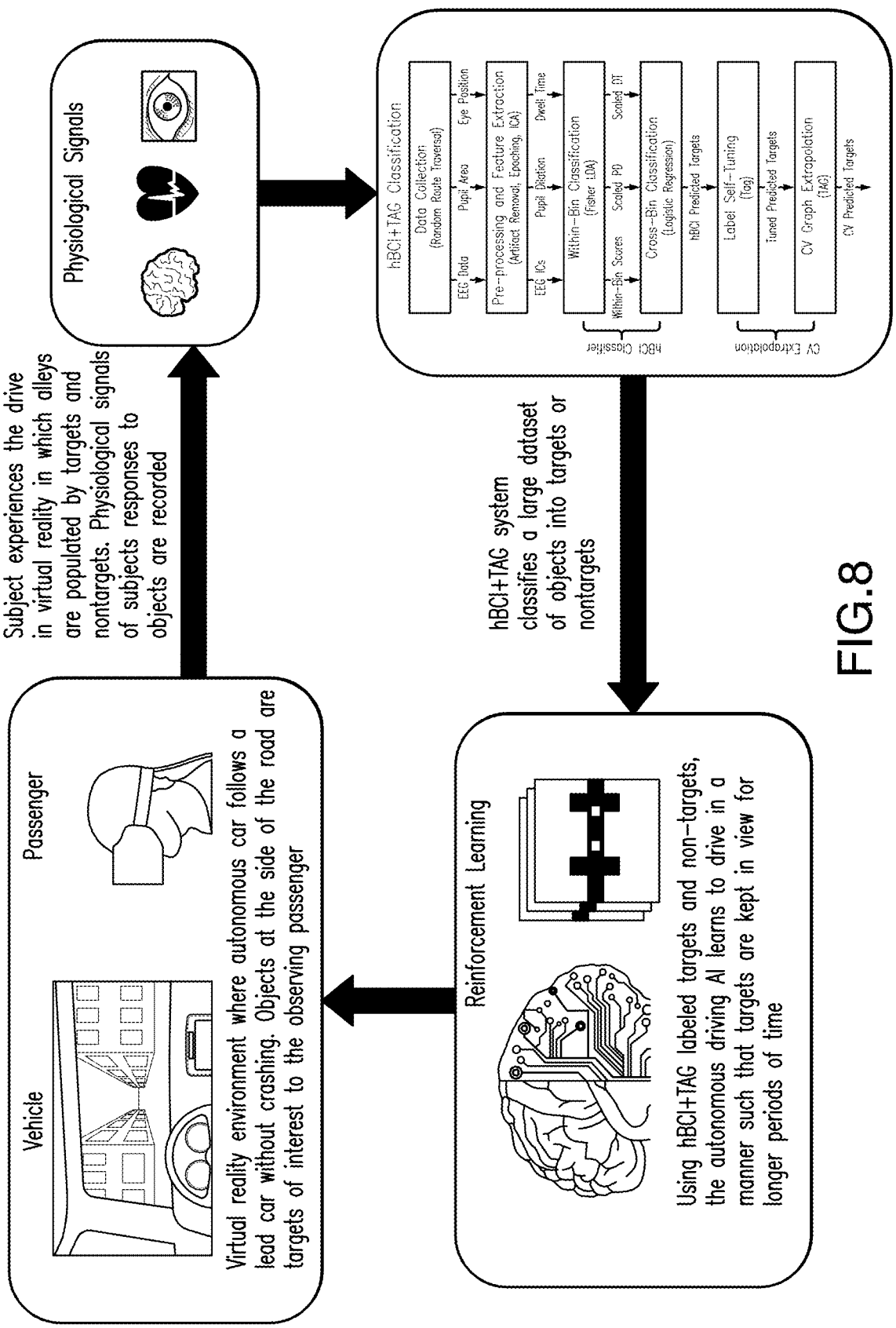
FIG. 8 is a diagram illustrating a closed loop design for the disclosed hBCI deep system in accordance with the present disclosure.

FIG. 8 is a diagram illustrating a closed loop design for the disclosed hBCI deep system. In the embodiment shown by FIG. 8, a subject's physiological responses to target and non-target stimuli can be recorded in a virtual environment while being guided by an AI agent. These physiological responses can be classified and extrapolated using the hBCI+TAG system. Using this extrapolated dataset, the AI agent can be trained to modify its driving behavior based on the passenger preferences derived from the hBCI+TAG system. After this AI agent has converged to a modified driving behavior, the subject can experience the ride again with this modified AI. Based on the modifications, the subject can have more time to fixate on targets of interest and/or can change his/her preferences to a different target category.

By using a closed loop design, the physiological signals can have a higher SNR hBCI+TAG classification can be improved, and dwell time can be increased for the subsequent iteration. Additionally or alternatively, the physiological signals can indicate a change of preferences and can modify the AI agent to increase the dwell time of different categories of objects.

As detailed above, although embodiments of the disclosed subject matter are discussed within the context of an autonomous vehicle, the disclosed system is applicable to other environments, such as, for example, a real-world environment, an augmented reality environment, and/or a virtual reality environment in which the human user's sensory input is to be used to influence actions in a virtual reality environment. By way of further example, Physiologically-Informed Artificial Intelligence (PI-AI) is discussed herein.

Figure 9:
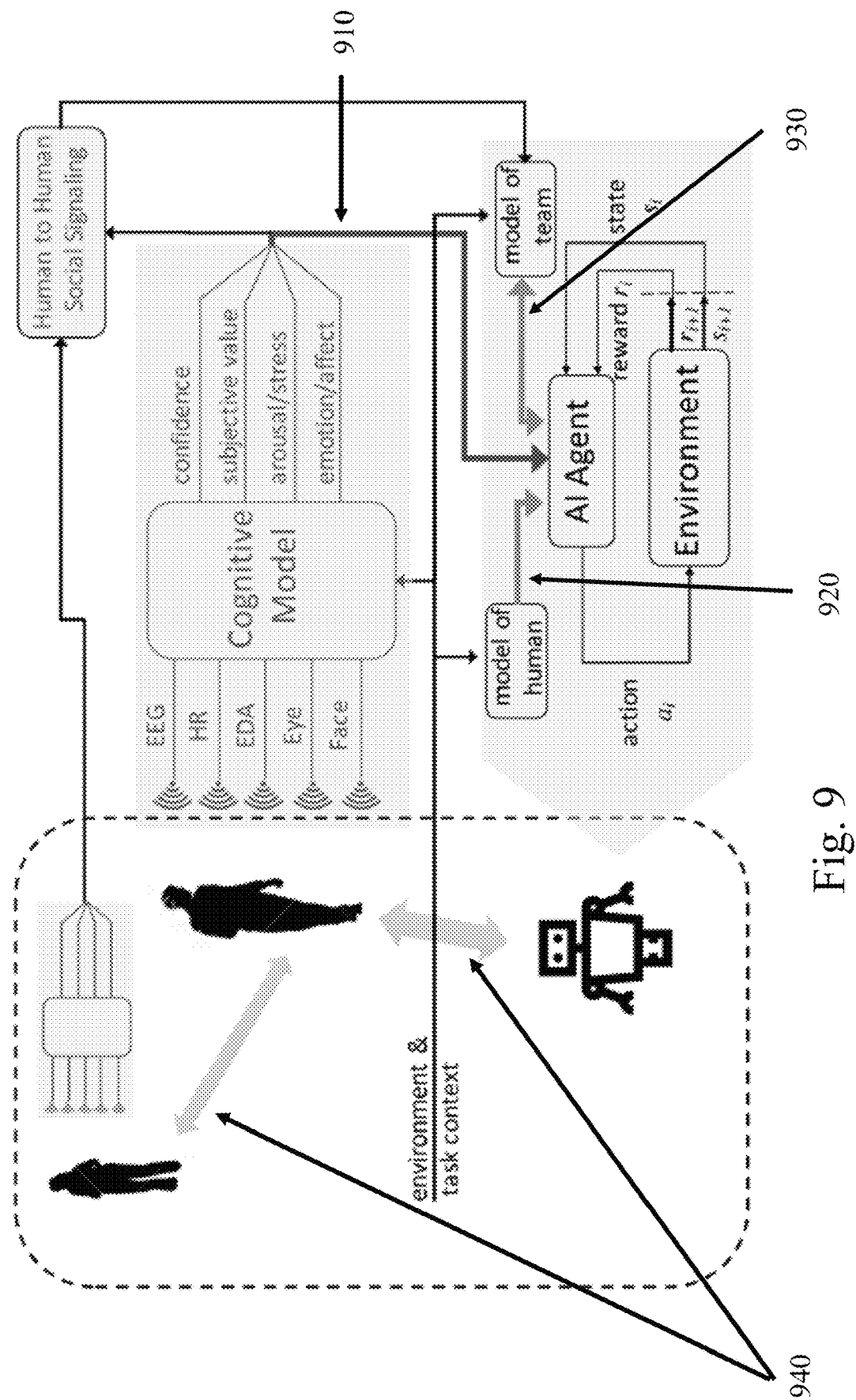
FIG. 9 is a diagram schematically illustrating a Physiologically-Informed Artificial Intelligence (PI-AD framework for enabling AI with a theory of mind for human-agent teaming in accordance with the present disclosure.

FIG. 9 schematically illustrates a Physiologically-Informed Artificial Intelligence (PI-AI) framework for enabling AI with a "theory of mind" for human-agent teaming. The term "physiologically-informed" is defined as using neural and systemic physiological information together with affective cues from facial features and posture and/or gait to infer latent cognitive and emotional states of a human(s) interacting with AI(s) in a collaborative decision-making task. PI-AI builds upon human-in-the-loop (HITL) learning by using latent cognitive and emotional states that can be inferred from neural, physiological, and behavioral cues. The cues can be investigated within the context of an environment and decision-making task in which a human an AI are collaborating. The PI-AI framework of FIG. 9 includes developing a plurality of modules which adapt AI to incorporate latent human cognitive and emotional state information and social signaling cues. The PI-AI framework can be achieved within the context of deep reinforcement learning, in which agents control robots that are interacting with other humans in a collaborative decision-making task.

In some embodiments, there are a plurality of objectives in focusing the adaptation of an AI agent whose policy is constructed via deep reinforcement learning. A first module 910 can use physiological and other subtle behavior cues to construct a model to infer cognitive state variables that are included as reinforcement signals in the reward function of the AI agent. For example, cues including confidence, subjective value, arousal and/or stress, emotion and/or affect and others can be used at 910. Environmental and task context and cognitive state information can then be utilized 920 to provide an internal model of a human teammate, using the model to make predictions to adapt the AI agent's policy. A cognitive model deployed across multiple humans 930 can be utilized to provide a model of social signaling 940, which is ultimately used to inform the AI agent of team dynamics.

By way of example only, a user can be operating a VR headset and performing a driving task through a city environment. The user's task is to record as many of the identification numbers of potential improvised explosive devices (IEDs) in the particular VR environment. The task starts with the two vehicles, with one vehicle following a lead vehicle and moving on a random path in the environment, with the human operator controlling the braking of the trailing vehicle so that there is no collision with the lead vehicle. Objects, including potential IEDs are on the side of the road and have, associated with them, 5-digit identification numbers, which the human operator must record (write down).

Human behavior and opportunistic sensing can be used in at least three ways. First, human behavioral input can be used as a reinforcement signal to learn a braking policy that learns how to keep the training vehicle a set distance from the lead vehicle. Second, the opportunistic sensing of neural-physio data, related to attentional orienting to the IED targets, can be used to label locations and propagate this information via a graph-based semi-supervised recognition system, which plans a path to other locations likely to have IEDs. Third, these opportunistically sensed neuro-physio signals can be used to refine the braking policy so that the policy is adapted to slow the vehicle when the vehicle is nearing a potential IED location.

In this example, the task goals, namely the ability to record as many of the IED identification numbers, can depend on how these different reinforcement signals and AI agents behave in order to reduce the workload of the user. At the beginning of the task the user can be focused on the necessary behavioral input needed to stop colliding with the lead vehicle. However, once the AI begins to learn a good braking policy, the user is enabled to disengage from the braking task, no longer needing to direct attention to that task or generate behavioral input. As such, the user's focus can turn to identifying potential IEDs, and recording their identification numbers.

Figures 10A, 10B:
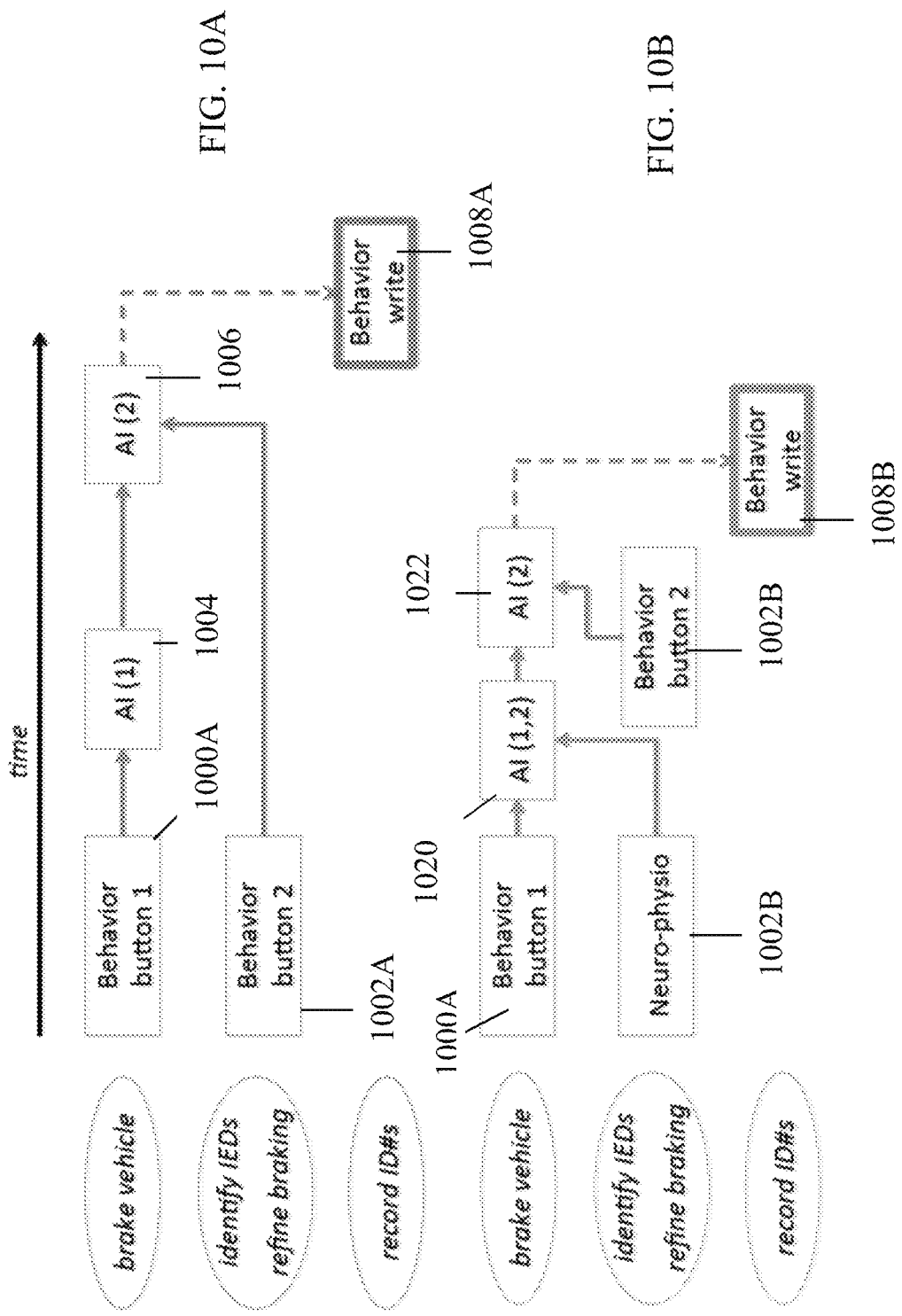
FIG. 10A and FIG. 10B are diagrams schematically illustrating modes for demonstration purposes in accordance with the present disclosure.

FIG. 10A and FIG. 10B serve to illustrate two example cases. In FIG. 10A, human behavioral input only is utilized, while in FIG. 10B, human behavioral and opportunistic sensing of neuro-physiological signatures of attentional orienting are utilized. In FIG. 10A, by way of example only, a first behavioral button 1000A and a second behavioral button 1002A (e.g., button presses) are used to both stop the vehicle and label potential IED locations. With behavioral reinforcement, AI (1) 1004 is trained so as to learn how to brake the car. Once this occurs, the human can dissociate the behavior for braking and transition behavior to labeling IED locations (second behavioral button 1002A). This is used to train AI (2) 1006 which learns a policy that first, it safely brakes the vehicle given the lead vehicle braking; second, plans a path which maximizes potential IED spotting; and third, slows the vehicle when approaching potential IEDs so that identification numbers are more easily recorded. Thus, AI (2) 1006 enables the human operator to perform the third behavior (write) 1008A to record the identification numbers of the IEDs, which is the goal of the task.

In FIG. 10B, there is a single behavioral task (braking the vehicle), and a covert response enabled via opportunistic sensing, namely labeling potential IED locations by detecting attentional orienting events via the neuro-physio decoding. This scenario allows for a more robust braking of the vehicle as the human operator must only execute a single overt response. Furthermore, this scenario enables a more accurate reinforcement to train the AI. The neuro-physio sensing is also covertly detecting orienting the events so that a dual AI (AI (1) and AI (2)) 1020 is learning to both brake the vehicle and slow down near potential IED locations.

Referring again to FIG. 10B, AI (1) and AI (2) 1020 can converge more quickly than AI (1) 1004 in FIG. 10A due to the reduced behavioral workload of the operator and simultaneous learning of the braking policy (avoid collision and slow for IED). AI (1) and AI (2) 1020 and 1022 are then tuned using behavior and immediately available to enable recording of identification numbers. The AI (2) 1022 learned in the description of FIG. 10B is learned more quickly and more efficiently than that learned in the description of FIG. 10A, such that a larger number of accurate identification numbers are recorded in the scenario of FIG. 10B.

It will be understood that the foregoing is only illustrative of the principles of the present disclosure, and that various modifications can be made by those skilled in the art without departing from the scope and spirit of the present disclosure.

What is claimed is:

1. A method for detecting reinforcement signals of a user or an environment through at least one sensor, comprising:
    positioning the user in the environment including one or more objects, events, or actions for the user to sense;
    collecting sensory information for the user from the at least one sensor, comprising capturing, tuning and extrapolating sensory information of the user in the environment, wherein the sensory information includes physiological signals of preferences of the user, wherein the sensory information comprises one or more electroencephalogram signals of the user;
    identifying, using a processor, one or more reinforcement signals of the user or the environment based on the collected sensory information;
    altering an artificial intelligence agent to respond to the one or more reinforcement signals;
    eliciting reinforcement to the artificial intelligence agent based on the identification of the one or more reinforcement signals of the user or the environment, where the reinforcement is elicited by the artificial intelligence agent receiving the reinforcement signals for staying or violating predetermined thresholds; and
    altering the environment based on the identification of the one or more reinforcement signals.

2. The method of claim 1, wherein the artificial intelligence agent is a deep reinforcement learning artificial intelligence agent.

3. The method of claim 1, further comprising determining a score indicative of a level of certainty that the one or more objects, events, or actions is a target.

4. The method of claim 1, further comprising extrapolating physiological signals of the user to identify secondary reinforcement signals within the environment.

5. The method of claim 1, further comprising decoding neural and ocular signals detected and mapping the decoded neural and ocular signals to a response task.

6. The method of claim 5, further comprising continuously reinforcing the artificial intelligence agent such that a behavior of the artificial intelligence agent is differentiated as proximity to one or more targets within the environment changes.

7. The method of claim 1, wherein the sensory information includes neural, physiological, or behavioral signatures relating to reinforcement signals of the user.

8. The method of claim 7, further comprising tuning and extrapolating the reinforcement signals over the one or more objects, events, or actions within in the environment.

9. The method of claim 7, further comprising inferring, based on the neural, physiological, or behavioral signatures, interest of the user in the one or more objects, events, or actions within the environment.

10. The method of claim 7, wherein the physiological signatures include at least one selected from the group consisting of brain wave patterns, pupil dilation, eye position, breathing patterns, micro expressions, electrodermal activity, heart activity, and reactions.

11. A computer system for utilizing reinforcement signals of a user or an environment through at least one sensor to alter a behavior of an artificial intelligence agent, comprising:
    a processor; and
    a memory, operatively coupled to the processor and storing instructions that, when executed by the processor, cause the computer system to:
        analyze the environment including objects, events, or actions therein;
        collect sensory information correlated to a state of the user or the environment from the at least one sensor, comprising capturing, tuning and extrapolating sensory information of the user in the environment, wherein the sensory information includes physiological signals of preferences of the user, wherein the sensory information comprises one or more electroencephalogram signals of the user;
        identify, via the processor, one or more reinforcement signals of the user or the environment based on the collected sensory information;
        alter the artificial intelligence agent to respond to the one or more reinforcement signals;
        eliciting reinforcement to the artificial intelligence agent, wherein the reinforcement is elicited by the artificial intelligence agent receiving the reinforcement signals for staying or violating predetermined thresholds, and the reinforcement trains the artificial intelligence agent to differentiate actions as proximity to the targets within the environment changes; and
        alter the environment based on the identification of the one or more reinforcement signals.

12. The computer system of claim 11, wherein the artificial intelligence agent is a deep reinforcement learning artificial intelligence agent.

13. The computer system of claim 11, further comprising determining a score indicative of a level of certainty that the one or more objects, events, or actions is a target.

14. The computer system of claim 11, further comprising decoding neural and ocular signals detected and mapping the decoded neural and ocular signals to a response task.

15. The computer system of claim 11, further comprising extrapolating physiological signals of the user to identify secondary reinforcement signals within the environment.

16. The computer system of claim 11, wherein the sensory information includes neural, physiological, or behavioral signatures relating to the reinforcement signals of the user.

17. The computer system of claim 16, wherein the physiological signatures include at least one selected from the group consisting of brain wave patterns, pupil dilation, eye position, breathing patterns, micro expressions, electrodermal activity, heart activity, and reactions.

18. A system for detecting reinforcement signals of a user in one or more objects, events, or actions within an environment through at least one sensor, comprising:
    a machine learning module operatively connected to the at least one sensor and configured to process sensory information for the user from the at least one sensor in response to the environment, wherein the sensory information comprises one or more electroencephalogram signals of the user, wherein the machine learning module includes:
        a processing circuit;
        a hybrid human brain computer interface (hBCI) module, comprising:
            one or more sensory input devices; and
        a reinforcement learning module; and
    a controller operatively connected to the machine learning module,
    wherein the reinforcement learning module contains data to navigate the environment, wherein the machine learning module is configured to capture, tune, and extrapolate neural and physiological signatures of preferences of the user in the environment, and wherein the machine learning module is configured to decode neural and ocular signals detected and map the decoded neural and ocular signals to a response task.

19. The system of claim 18, wherein the hBCI module is configured to decode neural, physiological, or behavioral signals and identify object labels from a subset of an object database, wherein the object labels include target labels and non-target labels, and wherein the machine learning module is configured to identify objects, events, or actions in the environment and utilize the labels to elicit reinforcement to the reinforcement learning module.

* * * * *